United States Patent [19]

Favstritsky et al.

[11] Patent Number: 4,829,118
[45] Date of Patent: May 9, 1989

[54] FLAME RETARDANT ABS RESIN COMPOSITIONS

[75] Inventors: Nicolai A. Favstritsky; Enrico J. Termine, both of Lafayette; Dennis M. Borden, West Lafayette, all of Ind.

[73] Assignee: Great Lakes Chemical Corporation, West Lafayette, Ind.

[21] Appl. No.: 107,700

[22] Filed: Oct. 9, 1987

[51] Int. Cl.$^4$ .............................................. C08K 5/03
[52] U.S. Cl. .................................. 524/412; 524/469
[58] Field of Search ............... 524/466, 469, 470, 411, 524/412

[56] References Cited

U.S. PATENT DOCUMENTS

| | | | |
|---|---|---|---|
| 2,676,946 | 4/1954 | McCurdy et al. | 524/469 |
| 3,134,747 | 5/1964 | Amos et al. | 524/469 |
| 3,457,204 | 7/1969 | Burger et al. | 260/2.5 |
| 3,658,634 | 4/1972 | Yanagi et al. | 524/144 |
| 3,817,912 | 6/1974 | Diebel et al. | 524/469 |
| 3,850,882 | 11/1974 | Underwood et al. | 524/464 |
| 3,901,834 | 8/1975 | Brackenridge | 524/469 |
| 3,920,606 | 11/1975 | Diebel et al. | 260/45.7 R |
| 3,943,195 | 3/1976 | Naarman et al. | 524/469 |
| 4,129,551 | 12/1978 | Rueter et al. | 524/469 |
| 4,154,712 | 5/1979 | Lee | 260/29.1 R |
| 4,172,826 | 10/1979 | Haaf et al. | 260/42.18 |
| 4,355,126 | 10/1982 | Haaf et al. | 524/411 |
| 4,388,429 | 6/1983 | Ilardo et al. | 524/94 |

FOREIGN PATENT DOCUMENTS

| | | | |
|---|---|---|---|
| 1117955 | 6/1968 | United Kingdom | 524/469 |
| 1121736 | 7/1968 | United Kingdom | 524/469 |

OTHER PUBLICATIONS

Eng Pi Chang et al., "Dynamic Mechanical . . . Fire Retardant High-Impact Polystyrene"-J. Applied Polymer Science, vol. 21, 2167-2180, (1977).

Primary Examiner—Veronica P. Hoke
Attorney, Agent, or Firm—Kirkland & Ellis

[57] ABSTRACT

Flame retardant ABS compositions incorporate an effective amount of a polybrominated higher alkylbenzene or mixture thereof and an enhancing agent.

9 Claims, No Drawings

FLAME RETARDANT ABS RESIN COMPOSITIONS

BACKGROUND OF THE INVENTION

1. Field of the Invention

The present invention relates to flame retardant ABS resin compositions and more particularly to a ABS rsin compositions incorporating polybrominated higher alkylbenzenes.

2. Description of the Prior Art

Traditionally, most flame retardants, although efficient in their function of retarding the rate of combustion in a resin system, have a tendency to affect adversely one or more key properties of the resin. For example, many flame retardant additives tend to reduce impact strength of the resin; to migrate from the resin composition, resulting in a phenomena known as "bloom"; to volatilize from the resin composition; to plasticize the resin composition adversely, thus lowering the heat deflection temperature, etc.

It is therefore essential that flame retardant agents be specifically tailored to the resin system so that in addition to its role as a flame retardant, the agent will additionally enhance the desirable characteristics of the resin composition. Those skilled in the art well known that the selection of such an application-specific flame retardant is unpredictable at best. Thus, even though a given agent may exhibit utility in a particular resin system, there is no guarantee that this agent will have any use at all with other resins.

Acrylonitrile-butadiene-styrene ("ABS") thermoplastics offer a good balance physical and mechanical properties such as good abuse resistance, heat resistance, moldability, stain resistance, chemical resistance and surface hardness. Because of their properties and their moderate cost, they have been chosen for use in a wide number of applications. For example, they are used by telephone equipment and automotive manufacturers who require materials of high impact strength.

ABS plastics are derived from acrylonitrile, butadiene and styrene. Some of the properties of typical ABS resins are described on pages 1-64, 1-66, and 1-68 of Harper's "Handbook of Plastics and Elastomers", published by McGraw-Hill Book Company in 1975.

A number of flame retardants have been described for ABS resins in the prior art. For example, the following materials have all been used in various ABS systems: bis-(tribromophenoxy) ethane, octabromodiphenyl ether, decabromodiphenyl ether, tetrabromobisphenol-A and its carbonate oligomers, and bis-(pentabromophenoxy)-ethane. Among the prior art specifically dealing with flame retarding ABS resins are U.S. Pat. No. 4,016,139; and U.S. Pat. No. 4,567,218 and references cited therein.

The foregoing flame retardant agents for ABS plastics have not been entirely satisfactory because of problems of "bloom" (also known as thermal migration), heat instability, ultraviolet light instability, discoloration and adverse effects on properties such as impact strength and flowability.

Underwood, et al. U.S. Pat. No. 3,850,882 disclose a three component flame retardant additive mixture for polyolefins, especially polypropylene, consisting of (a) a halogenated alkyl benzene of the formula

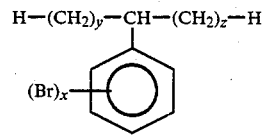

where X may be Cl or Br; and Y is a hydrocarbon of 1-20 carbon atoms; a is an integer from 0 to 3; and n is an integer from 3 to 6;

(b) stannic oxide; and (c) a bis-phenylalkylene hydrocarbon.

The patent does not suggest that such a flame retardant mixture has any utility in ABS resins, let alone that the halogenated alkylbenzene alone would have any such use.

Rueter, et al. U.S. Pat. No. 4,129,551 discloses non-flammable polyester compositions incorporating a phosphorus-containing, multiple component flame retardant additive consisting of:

(a) a triarylphosphine oxide or an aryl or alkyl ester of an arylphosphinic acid;

(b) a nuclear brominated alkylbenzene; and (c) customary auxiliary agents and additives.

Polyester compositions based on such agents contain 0.5-10% by weight of bromine and 0.1-2% by weight of phosphorus. Among the nuclear brominated alkylbenzenes described were compounds of the following formula:

$$H-(CH_2)_y-CH-(CH_2)_z-H$$
$$(Br)_x-\bigcirc$$

where x=2 to 5; y and z each are zero or an integer from 1 to 17; and sum of y+z is an integer between 7 and 17. Mixtures of such agents are also suggested. There is no disclosure that the additive mixture has any utility in ABS resins or that the nuclear brominated alkylbenzene may be so-used alone for that or any other purpose.

Accordingly, a primary object of this invention is to provide an agent capable of flame retarding ABS resin compositions without exhibiting problems of bloom, heat or light instability, impact strength, or any of the other disadvantages of the prior art ABS flame retardant agents.

A further object is to provide flame retardant ABS resin compositions that exhibit the desired level of flame retardancy without suffering any deterioration of physical properties.

Another object is to utilize polybrominated higher alkylbenzenes as flame retardant agents for ABS resin compositions.

SUMMARY OF THE INVENTION

The foregoing and other objects, advantages and features of this invention may be achieved with flame retardant ABS resin compositions comprising a normally combustible ABS resin; an effective amount of a polybrominated $C_{6-18}$ higher mono-or di-alkylbenzene or mixtures thereof; and an enhancing agent. Preferably, the polybrominated alkylbenzene utilized in accordance with this invention is a tetra- or penta-bromo secondary or tertiary alkyl benzenes, wherein the alkyl group contains 6-18 carbon atoms, or a tri- or tetra-bromo secondary or tertiary dialkylbenzenes, wherein the alkyl group contain 6-18 carbon atoms.

The polybrominated alkylbenzenes contain about 30-70 percent bromine by weight, preferably about 50-70 percent bromine by weight. The compositions of this invention preferably comprise about 50 to 90 percent ABS thermoplastic resin, about 5 to 30 percent polybrominated higher alkylbenzene, and about 0.1 to 15 percent enhancing agent, all by weight of the composition.

DETAILED DESCRIPTION OF THE PREFERRED EMBODIMENTS

In accordance with this invention, polybrominated higher alkylbenzenes are useful in the preparation of flame retardant thermoplastic ABS resins in accordance with procedures known in the art. The novel compositions of this invention are distinguished from known flame retardant ABS compositions by improved properties.

The term "Higher" as used herein with respect to polybrominated higher alkylbenzenes is intended to include secondary and tertiary alkylbenzenes and mixtures thereof.

Preferred novel flame retardant ABS compositions may be prepared by admixing from about 50% to about 90% by weight thermoplastic ABS resin; from about 5% to about 30% by weight polybrominated higher alkylbenzene; and 0.1% to about 15% enhancing agent, where the percentages are based on the total weight of the resulting admixture of these three components. Most desirably, the compositions of this invention comprise about 65-90% ABS resin; about 8-25% polybrominated alkyl benzene; and about 2-10% enhancing agent.

The ABS resin may be any thermoplastic resin formed by copolymerizing styrene, acrylonitrile and butadiene monomers, or by blending a styrene/acrylonitrile copolymer with butadiene-based rubber, or by grafting butadiene-based rubber with styrene/acrylonitrile chains. Thus, substantially any suitable acrylonitrile-butadiene-styrene composition may be used, containing each component of the terpolymer in substantially any proportion. The ABS may contain or may be substantially free of other additives such as stabilizers, plasticizers, dyes, pigments, fillers, and the like.

The polybrominated higher alkylbenzene flame retardant additives utilized in accordance with the present invention are nuclear halogenated aromatic compounds of the generalized structures (I) and (II):

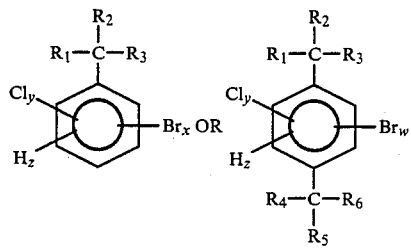

wherein x is 3 to 5, y is zero or 1, w is 2 to 4, $R_1$ and $R_4$ are hydrogen or methyl, and $R_2$, $R_3$, $R_5$, $R_6$ are alkyl ranging independently from 1 to 16 carbon atoms. Also, numerically combining $R_1$, $R_2$ and $R_3$ or $R_4$, $R_5$ and $R_6$, the total number of carbon atoms ranges from 5 to 17. Mixtures of such compounds may be produced and are especially preferred.

Compounds of structure (I) are tetra- and penta-halo secondary or tertiary alkylbenzenes, wherein the alkyl group is of 6 to 18 carbon atoms. Compounds of structure (II) are tri- and tetra-halo secondary or tertiary dialkybenzenes wherein the alkyl group has 6 to 18 carbon atoms.

Preferred compounds produced in accordance with this invention are secondary and tertiary decyl, undecyl, dodecyl, tridecyl and tetradecyl benzenes containing 4 to 5 bromines on the benzene nucleus. In place of individual compounds, it is especially preferred to employ mixtures of such compounds. In general, pure brominated primary alkylbenzenes are solids. However, mixtures of brominated secondary and tertiary alkylbenzenes are liquids having a broader range of uses due to their liquid state. The polybrominated predominantly secondary and tertiary alkylbenzenes produced in accordance with this invention generally have a bromine content between 30% and 70% and a chlorine content between 0% and 10%, by weight.

The polybrominated alkylbenzenes of this invention are produced by the direct bromination of the corresponding unbrominated material using an excess of liquid bromine as the reaction medium, using bromine chloride as the brominating agent, and using an antimony halide catalysts described in Favstritsky, et al. copending United States patent application Ser. No. 107,088 entitled "Process for Producing Polybrominated Higher Alkylbenzenes," filed of evendate.

As noted above, it is preferred to utilize mixtures of individual polybrominated benzenes in accordance with this invention, and these mixtures may be derived from mixtures of the corresponding alkylbenzenes. The mixtures of individual polybrominated alkylbenzenes that are most preferred are so-preferred for the additional reason that the corresponding hydrocarbon mixtures are readily available intermediates in the detergent industry.

Especially preferred polybrominated alkylbenzenes in accordance with this invention are the tetra- and penta-bromo derivatives of secondary, straight chain alkylbenzenes of the structure (III):

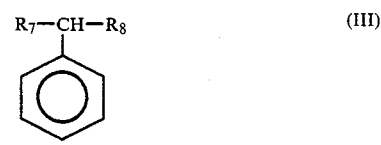

where $R_7$ and $R_8$ are independently linear alkyl groups containing 1 to 12 carbon atoms and where, when numerically combined, $R_7$ and $R_8$ contain between 9 and 13 carbon atoms, primarily 9 and 11 carbon atoms and where $R_7$ is about 25 to 35% methyl. Such a secondary, straight chain alkylbenzene is commercially available from Monsanto Co. under the trademark "DODANE S," which is a mixture of secondary monoalkylbenzenes, wherein the alkyl is primarily undecyl and dodecyl.

Another preferred polybrominated alkylbenzene is derived from a secondary, straight chain alkylbenzene of formula (III), wherein the numerical combination of $R_7$ and $R_8$ is between 9 and 11 carbon atoms and where $R_7$ is about 10 to 15% methyl. Such a preferred alkylbenzene is commercially available from Monsanto Co. under the trademark "ALKYLATE 215," which is a mixture of secondary monoalkylbenzenes similar to "DODANE S."

Still another preferred polybrominated alkylbenzene is derived from a tertiary, branched chain alkylbenzene of the structure (IV):

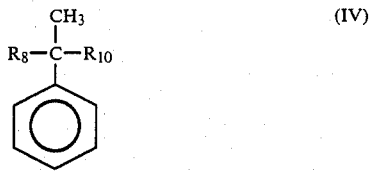

where $R_9$ and $R_{10}$ are independently alkyl groups containing 1 to 9 carbon atoms and where the numerical combination of $R_9$ and $R_{10}$ is primarily 8 to 11 carbon atoms. Such a tertiary alkyl benzene, in which $R_9$ and $R_{10}$ are typically nonlinear alkyl groups, is commercially available from Monsanto Co. under the trademark "DODANE H," which is a mixture of tertiary branched chain, monoalkylbenzenes, wherein alkyl is primarily dodecyl.

Still another preferred polybrominated alkylbenzene is derived from a secondary, straight chain dialkylbenzene of the formula (V):

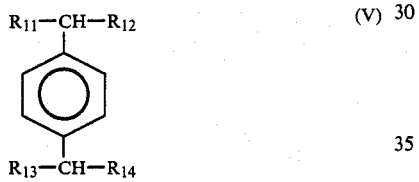

where $R_{11}$, $R_{12}$, $R_{13}$, and $R_{14}$ are independently linear alkyl groups containing 1 to 10 carbon atoms and where, when numerically combined, $R_{11}$ and $R_{12}$ or $R_{13}$ and $R_{14}$ contain primarily 11 carbon atoms. Such a material, in which para substitution predominates and which contains up to 10% monoalkylbenzenes, is commercially available from Pilot Chemical Co. under the trademark "ARISTOL E," which is a mixture of secondary dialkylbenzenes where in alkyl is primarily dodecyl. Other commercially available alkylbenzenes may of course also be brominated and then employed in accordance with the present invention.

The polybrominated higher alkylbenzenes of the present invention are high boiling liquids, nonvolatile, thermally stable, hydrolytically stable and flame resistant. They may be incorporated in the ABS compositions of this invention during compounding as is known to those skilled in the art. Exemplary compounding techniques are illustrated in the Examples hereinafter.

Mixtures of the polybrominated alkylbenzenes of this invention with other flame retardant agents may also be advantageously employed. Combinations of polybrominated alkylbenzenes with other flame retardant agents for ABS resins such as decabromodiphenyl ether and brominated polystyrenes permit surprising improvement in physical properties such as impact strength to be achieved. In addition, other properties such as resistance to heat distortion may be improved. Substantially all combinations of amounts and proportions of polybrominated alkylbenzenes and such other flame retardant agents may be employed with improved results.

The compositions of this invention also desirably incorporate one or more enhancing agents. Enhancing agents useful in accordance with this invention comprise the oxides and halides of groups IV-A and V-A of the periodic table; organic or inorganic compounds of phosphorous, nitrogen, boron, or sulfur; and oxides and halides of, for example, zinc, magnesium and titanium, all as disclosed in U.S. Pat. No. 4,016,139. Preferred enhancing agents in accordance with this invention are the oxides of antimony, arsenic and bismuth, with the oxides of antimony being especially preferred. Antimony trioxide is the most preferred enhancing agent used in the compositions of this invention. As noted, the enhancing agent is supplied at the level of about 0.1–15 percent by weight. Preferably, the enhancing agent is used at a level of about 2–10 percent by weight.

The scope of the present invention includes the incorporation of other additives in the composition so far as to affect a particular end result. Such additives include, without limitation, heat stabilizers, light stabilizers, plasticizers, pigments, preservatives, ultraviolet stabilizers, fillers, other flame retardants, antioxidants, antistatic agents, and other materials well known to those skilled in the art, for example, as described in Modern Plastic Encyclopedia, Vo. 63, No. 10A, McGraw-Hill, Inc. (1986).

The above described other additive materials which may be employed in the composition of this invention can be utilized in any amounts which will not substantially adversely affect the properties of the composition. In general, such amount will be from about 0% to about 80%, based on the total weight of the composition.

EXAMPLES

The following preparations and examples are given to illustrate the invention and should not be construed as limiting its scope. All parts are by weight unless otherwise indicated.

In the examples given below, the polybrominated higher alkylbenzenes of this invention and other prior art brominated flame retardant compounds are used to illustrate the present invention. The identity of the flame retardant agents and the weight percent bromine are given in Table I.

TABLE I

| Compound | Wt % Bromine | Description and Comments |
|---|---|---|
| A-1 | 45 | Polybrominated DODANE S |
| A-2 | 60 | Polybrominated DODANE S |
| B | 79 | Octabromodiphenyl ether |
| C | 58.7 | Tetrabromobisphenol-A carbonate oligomer |
| D | 70 | 1,2-Bis(tribromophenoxy)ethane |
| E | 83.3 | Decabromodiphenyl ether |
| F | 65 | Brominated polystyrene |

EXAMPLE 1

A flame retardant composition was prepared by blending 24.0 parts of polybrominated alkylbenzene (Compound A-1 45 $B_2$); 71.0 parts of ABS resin, which is available from Borg-Warner Corporation as CYCOLAC GSM-1000, and 5.0 parts antimony trioxide, which is available from M & T Chemical Company as Thermoguard S. Compound A-1 is a polybrominated DODANE S prepared in accordance with Example 5 of copending Favstritsky, et al. United States patent application entitled "Process for Producing Polybrominated Higher Alkylbenzenes," filed herewith, corresponding to a polybrominated dodecylbenzene having about 2.6 bromines per molecule.

The resultant mixture was blended in a Brabender Prep-Center mixer (Model R6, C.W. Brabender Instruments, Inc., S. Hackensack, NJ) at 200° C. until a homogeneous mass developed. The admixture was cooled, ground into chips, and molded into test specimens. The chips were injection molded in a one-ounce Newbury Injection Molder (Model HI-30 RS, Newbury Industries, Inc., Newbury, OH). Conditions for injection molding are given in Table II. The resulting composition had a bromine content of 10.8% by weight.

TABLE II

| INJECTION MOLDING MACHINE PARAMETERS | |
| --- | --- |
| Stock Temperature | 430° F. |
| Mold Temperature | 100° F. |
| Initial Ram Pressure | 1900 psi |
| Secondary Ram Pressure | 1000 psi |
| Initial Injection Time | 5 sec |
| Total Injection Time | 10 sec |
| Cycle Time | 25 sec |

COMPARATIVE EXAMPLE 2

A composition was prepared by the method described in Example 1 except that the amount of ABS Resin (GSM-1000) was raised to 100 parts.

COMPARATIVE EXAMPLE 3

A composition was prepared by blending 95.0 parts GSM-1000 and 5.0 parts antimony trioxide by the method described in Example 1.

COMPARATIVE EXAMPLE 4

A composition was prepared by blending 90.0 parts GSM-1000, 5.0 parts chlorinated polyethylene, which is available from The Dow Chemical Company as TYRIN CPE-4213S, and 5.0 parts antimony oxide by the method described in Example 1.

COMPARATIVE EXAMPLES 5-6

A flame retardant composition was prepared using the method of Example 1, except that the polybrominated higher alkylbenzene (Compound A-1) is replaced by octabromodiphenyl ether (Compound B) or tetrabromobisphenol-A - carbonate oligomer (Compound C), respectively, in proportion stated in Table III, so as to maintain a 10.8 percent by weight bromine concentration in the resulting polymer composition.

EXAMPLE 7

A flame retardant composition is prepared using the method of Example 1, except that portions of the ABS resin are replaced with CPE-4213S in proportions stated in Table III, so as to maintain a 10.8% by weight bromine concentration in the resulting polymer composition.

EXAMPLE 8

A flame retardant composition was prepared using the method of Example 7, except that Compound A-1 was replaced with Compound A-2. Compound A-2 is a polybrominated DODANE S produced by the procedure of Example 1 of copending Favstritsky et al. United States patent application entitled "Process for Producing Polybrominated Higher Alkylbenzenes" and corresponds to a polybrominated dodecyl benzene having about 4.5 bromine atoms per molecule.

COMPARATIVE EXAMPLES 9-13

A flame retardant composition was prepared using the method of Example 7, except that Compound A-1 was replaced by octa-bromodiphenyl ether (Compound B); the carbonate oligomer of tetrabromobisphenol-A (Compound C); 1,2-bis-(tribromophenoxy)-ethane (Compound D); decabromodiphenyl ether (Compound E); and polybrominated polystyrene (Compound F), respectively in proportions stated in Table III so as to maintain a 10.8% by weight bromine concentration in the resulting polymer composition.

EXAMPLE 14

A flame retardant composition was prepared using the method of Example 7, except that the bromine concentration was adjusted to 8.8% by weight.

EXAMPLES 15-24

A series of flame retardant composition was prepared using the method of Example 7, except that portions of the ABS resin and portions of the halogenated aromatics were replaced with other halogenated compounds in such a fashion as to produce a composition containing 10.8 percent by weight bromine. These formulations are presented in Table III.

EXAMPLES 25-29

A series of flame retardant compositions was prepared using the method of Example 7, except that a portion of the ABS resin was replaced with 0.5 parts ultraviolet light absorber, which is available from Ciba Geigy Corporation as TINUVIN 327 and 1.0 parts antioxidant, which is available from Ciba-Geigy Corporation as Irganox 1076.

Flame retardancy and physical properties of the various injection molded samples obtained from Examples 1–29 are reported in Tables IV and V, which identify the test procedures employed, all of which are well known to those skilled in the art. Bloom was measured in the following manner. Test plaques were aged at 70° C. for two weeks. Periodic visual inspections were made to detect the presence of deposits on the specimen surface.

TABLE III

| | BROMINATED COMPOUNDS | | | | OTHER ADDITIVES (PBW) | | | |
| --- | --- | --- | --- | --- | --- | --- | --- | --- |
| EXAMPLE | TYPE | PBW | TYPE | PBW | $Sb_2O_3$ | CPE-4213S | TINUVIN 327 | IRGANOX 1076 |
| 1 | A1 | 24.0 | — | — | 5.0 | — | — | — |
| COMP EX 2 | — | — | — | — | — | — | — | — |
| COMP EX 3 | — | — | — | — | 5.0 | — | — | — |
| COMP EX 4 | — | — | — | — | 5.0 | 5.0 | — | — |
| COMP EX 5 | B | 13.7 | — | — | 5.0 | — | — | — |
| COMP EX 6 | C | 18.6 | — | — | 5.0 | — | — | — |
| 7 | A1 | 24.0 | — | — | 5.0 | 5.0 | — | — |
| 8 | A2 | 18.0 | — | — | 5.0 | 5.0 | — | — |

TABLE III-continued

| EXAMPLE | BROMINATED COMPOUNDS | | | | OTHER ADDITIVES (PBW) | | | |
|---|---|---|---|---|---|---|---|---|
| | TYPE | PBW | TYPE | PBW | $Sb_2O_3$ | CPE-4213S | TINUVIN 327 | IRGANOX 1076 |
| COMP EX 9 | B | 13.7 | — | — | 5.0 | 5.0 | — | — |
| COMP EX 10 | C | 18.6 | — | — | 5.0 | 5.0 | — | — |
| COMP EX 11 | D | 15.8 | — | — | 5.0 | 5.0 | — | — |
| COMP EX 12 | E | 13.0 | — | — | 5.0 | 5.0 | — | — |
| COMP EX 13 | F | 15.8 | — | — | 5.0 | 5.0 | — | — |
| 14 | A2 | 14.7 | — | — | 5.0 | 5.0 | — | — |
| 15 | A1 | 12.0 | E | 6.5 | 5.0 | 5.0 | — | — |
| 16 | A1 | 6.0 | E | 9.8 | 5.0 | 5.0 | — | — |
| 17 | A1 | 12.0 | F | 7.9 | 5.0 | 5.0 | — | — |
| 18 | A1 | 6.0 | F | 11.9 | 5.0 | 5.0 | — | — |
| 19 | A1 | 12.0 | C | 9.3 | 5.0 | 5.0 | — | — |
| 20 | A1 | 6.0 | C | 14.0 | 5.0 | 5.0 | — | — |
| 21 | A2 | 9.0 | D | 7.9 | 5.0 | 5.0 | — | — |
| 22 | A2 | 4.5 | D | 11.9 | 5.0 | 5.0 | — | — |
| 23 | A2 | 9.0 | E | 6.5 | 5.0 | 5.0 | — | — |
| 24 | A2 | 4.5 | E | 9.8 | 5.0 | 5.0 | — | — |
| 25 | A2 | 18.0 | — | — | 5.0 | 5.0 | 0.5 | 1.0 |
| 26 | A2 | 9.0 | D | 7.9 | 5.0 | 5.0 | 0.5 | 1.0 |
| 27 | A2 | 4.5 | D | 11.9 | 5.0 | 5.0 | 0.5 | 1.0 |
| 28 | A2 | 9.0 | E | 6.5 | 5.0 | 5.0 | 0.5 | 1.0 |
| 29 | A2 | 4.5 | E | 9.8 | 5.0 | 5.0 | 0.5 | 1.0 |

TABLE IV

| EXAMPLE | NOTCHED IZOD STRENGTH ft-lb/in ASTM D256 | HEAT DEFLECTION °F. ASTM D648 | FLAMMABILITY UL-94 | TENSILE STRENGTH psi ASTM D638 | ELONGATION % ASTM D638 | FLEXURAL STRENGTH psi ASTM D790 | FLEXURAL MODULUS psi × $10^5$ ASTM D790 | BLOOM |
|---|---|---|---|---|---|---|---|---|
| 1 | 3.8 | 152 | V-2 | — | — | — | — | No |
| COMP EX 2 | 5.9 | 178 | HB | — | — | — | — | No |
| COMP EX 3 | 3.0 | 178 | HB | — | — | — | — | No |
| COMP EX 4 | 3.1 | 174 | HB | — | — | — | — | No |
| COMP EX 5 | 2.1 | 165 | V-2 | — | — | — | — | Yes |
| COMP EX 6 | 0.5 | 173 | V-2 | — | — | — | — | No |
| 7 | 5.0 | 150 | V-0 | — | — | — | — | No |
| 8 | 4.6 | 160 | V-0 | 5200 | 6 | 7400 | 2.8 | No |
| COMP EX 9 | 2.4 | 155 | V-0 | 5900 | 14 | 9800 | 3.3 | Yes |
| COMP EX 10 | 0.8 | 178 | V-0 | 6400 | 4 | 10500 | 3.7 | No |
| COMP EX 11 | 2.3 | 150 | V-0 | 5300 | 11 | 8800 | 3.2 | Yes |
| COMP EX 12 | 1.5 | 168 | V-0 | 5300 | 13 | 9300 | 3.2 | Yes |
| COMP EX 13 | 0.7 | 181 | V-0 | — | — | — | — | No |
| 14 | 4.9 | 159 | V-1 | — | — | — | — | No |
| 15 | 4.9 | 156 | V-0 | — | — | — | — | No |
| 16 | 3.2 | 164 | V-0 | — | — | — | — | No |
| 17 | 3.5 | 165 | V-2 | — | — | — | — | No |
| 18 | 1.4 | 163 | V-2 | — | — | — | — | No |
| 19 | 2.6 | 157 | V-0 | — | — | — | — | No |
| 20 | 0.8 | 170 | V-0 | — | — | — | — | No |
| 21 | 4.6 | 162 | V-0 | — | — | — | — | Slight |
| 22 | 4.2 | 163 | V-0 | — | — | — | — | Slight |
| 23 | 1.2 | 170 | V-0 | — | — | — | — | No |
| 24 | 4.5 | 166 | V-0 | — | — | — | — | No |

TABLE V

| | LIGHT STABILITY (DELTA E) EXPOSURE TIME (hours) | | |
|---|---|---|---|
| EXAMPLE | 75 | 150 | 300 |
| 25 | 6.5 | 10 | 15 |
| 26 | 5.2 | 11 | 14 |
| 27 | 2.7 | 1.6 | 1.9 |
| 28 | 14 | 19 | 23 |
| 29 | 12 | 17 | 22 |
| COMP EX 9 | 3.3 | 12 | 18 |
| COMP EX 10 | 4.9 | 4.1 | 2.9 |
| COMP EX 11 | 5.8 | 12 | 18 |

The Tables IV and V show results of the experimental evaluations of the various test specimens, the composition of which is given in Table III, may be summarized as follows.

Example 1 illustrates a flame retardant ABS formulation incorporating polybrominated DODANE S in accordance with this invention. A flammability rating of V-2 was achieved, and bloom was not observed.

Comparative Example 2 shows that the virgin ABS is normally flammable and not flame retarded.

Comparative Example 3 illustrates that antimony trioxide alone at 5.0 parts does not flame retard ABS.

Comparative Example 4 illustrates that both antimony trioxide and chlorinated polyethylene do not flame retard ABS.

Comparative Examples 5–6 show that other flame retardants such as octabromodiphenyl ether (Compound B) and the carbonate oligomer of tetrabomobisphenol-A (Compound C) are effective flame retardants but that the former bloomed and the latter adversely lowered the impact strength.

Example 7 illustrates that incorporation of chlorinated polyethylene with polybrominated DODANE S (Compound A-1) leads to V-O flame retardance and impact strength improvement.

Example 8 shows that 60% polybrominated DODANE S (Compound A-2) in presence of chlorinated polyethylene yielded an ABS composition with V-O flame retardance, improved heat deflection temperature, excellent impact and no bloom. The Example also illustrates that Compound A-2 is preferred.

Comparative Examples 9–13 show that replacing polybrominated alkylbenzenes with other flame retardants (i.e., Compounds B, C, D, E, or F) resulted in deterioration of one or more of the desirable ABS resin characteristics, such as impact, heat deflection temperature or bloom.

Example 14 shows the effect of lower loading of polybrominated higher alkylbenzene (Compound A-2). Even at lower loading V-1 flame retardance was achieved.

Examples 15–20 show mixtures of polybrominated higher alkylbenzene (Compound A-1) with other flame retardants.

Examples 21–29 show mixtures of polybrominated higher alkylbenzene (Compound A-2) with other flame retardants. The mixture of polybrominated higher alkylbenzene (Compound A-2) with 1,2-bis-(tribromophenoxy)ethane (Compound D) resulted in a UV stable ABS composition (See Table V, ex. 27).

It is especially important to note that ABS resins incorporating the polybrominated higher alkylbenzenes of this invention exhibit greater impact strength and resistance to bloom when compared with other representative flame retardant agents including those that have been widely used on a commercial basis in ABS resins.

Thus, as shown in Table VII, which presents data from the foregoing Examples in slightly different form, the impact strength of flame retarded ABS is in all cases superior to that obtained with 1,2-bis-(tribromophenoxy)ethane (Compound D), octabromodiphenyl ether (Compound B), decabromodiphenyl ether Compound E), the carbonate oligomer of tetrabromobisphenol A Compound C), and polybrominated polystyrene (Compound F.).

TABLE VII

| Additive Compound |          | Impact Strength |
|---|---|---|
| Compound A-1 | (Ex. 1)  | 3.8 |
| Compound A-2 | (Ex. 8)  | 4.6 |
| Compound B   | (Ex. 5)  | 2.1 |
| Compound B   | (Ex. 9)  | 2.4 |
| Compound C   | (Ex. 6)  | 0.5 |
| Compound C   | (Ex. 10) | 0.8 |
| Compound D   | (Ex. 11) | 2.3 |
| Compound E   | (Ex. 12) | 1.5 |
| Compound F   | (Ex. 13) | 0.7 |

Use of the polybrominated higher alkylbenzenes of this invention in ABS resin formulations also suppresses bloom. In the case of each of octabromodiphenyl ether (Examples 5 and 9), decabromodiphenyl ether (Example 12) and 1,2-bis-(tribromophenoxy) ethane (Example 11), severe bloom was noted. However, there was no evidence of bloom in compositions comprising mixtures of the agents of this invention with octabromodiphenyl ether (Examples 19 and 20). The same observation was also made in the case of certain combinations of polybrominated higher alkylbenzenes with decabromodiphenyl ether (Examples 17 and 18). In addition, bloom was markedly reduced with certain samples of polybrominated higher alkylbenzenes in combination with 1,2-bis-(tribromophenoxy)ethane (Examples 21 and 22.) And, no bloom problems were observed when the agents of this invention were used by themselves (Examples 1,7,8 and 14).

COMPARATIVE EXAMPLE 30

In order to evaluate the efficacy in ABS resin systems of prior art flame retardant agents utilizing polybrominated alkyl benzenes, a series of test samples were prepared utilizing the flame retardant additive mixtures of Underwood U.S. Pat. No. 3,858,882 and Rueter et al. U.S. Pat. No. 4,129,551. In addition, samples were also prepared utilizing Coimpound A-2 described above, a 60% bromine-containing polybrominated alkyl benzene in combination with antimony trioxide in the polyethylene terephthalate and polypropylene resins to which the Rueter and Underwood Patents are respectively directed.

More particularly, the following six samples were prepared. Samples 1 and 2 utilize the combination of Compound A-2 in combination with triphenylphosphine oxide as taught by Rueter, et al. in ABS resin. Sample 1 utilizes the flame retardant additive mixture at the level taught by Rueter, and Sample 2 uses the same additive mixture at higher loadings in accordance with the teachings of the present invention.

Samples 3 and 4 utilize mixtures of pentabromotoluene, bicumyl, stannic oxide, and IRGANOX 1076, as taught by the Underwood patent. Sample 3 employs the Underwood flame retardant additive mixture at the preferred level taught by Underwood, and Sample 4 employs the agent at levels in accordance with the teachings of the present invention.

Sample 5 employs the preferred Compound A-2 of the present invention in polypropylene (the resin system disclosed in Underwood), and Sample 6 uses Compound A-2 in polyethylene terephthalate (the resin to which Rueter, et al. is directed.) Examples 5 and 6 employ Compound A-2 at the preferred levels in accordance with the present invention.

Each of the six samples was evaluated for flame retardance in accordance with the UL-94 procedure; for heat distortion temperature ("HDT"); and for compatibility with the resin. The composition of the test samples and results of the test observations are given in the following Table VIII.

TABLE VIII

| | SAMPLES OF EXAMPLE 30 | | | | | |
|---|---|---|---|---|---|---|
| | 1 | 2 | 3 | 4 | 5 | 6 |
| COMPONENT | | | | | | |
| ABS | 92.6 | 64.0 | 96.97 | 76.18 | — | — |
| POLYPROPYLENE | — | — | — | — | 77.0 | — |
| PET | — | — | — | — | — | 77.0 |
| Compound A-2 | 3.7 | 18.0 | — | — | 18.0 | 18.0 |
| Triphenylphosphine Oxide | 3.7 | 18.0 | — | — | — | — |
| Pentabromotoluene | — | — | 1.75 | 13.18 | — | — |
| Bicumyl | — | — | 0.39 | 3.03 | — | — |
| Stannic Oxide | — | — | 0.97 | 7.51 | — | — |
| Irganox 1076 | — | — | 0.10 | 0.10 | — | — |
| Antimony Oxide | — | — | — | — | 5.0 | 5.0 |
| PROPERTIES | | | | | | |
| UL-94, 1/16" | Fail | V-2 | Fail | Fail | V-2 | V-0 |
| HDT, °F. | — | 100 | — | — | — | — |
| Compatibility | — | — | — | — | BAD | BAD |

Samples 1, 2 and 6 of Table VIII show that when a polybrominated alkylbenzene is used in ABS in the form of the flame retardant additive described by Rueter, et al. at loading levels taught by Rueter, et al. (Sample 1); at the preferred loadings levels of the present invention (Sample 2), or when used in PET at levels in accordance with the teachings of the present invention, no useful formulations were obtained. Sample 1 was not flame retardant as measured by the UL-94 test. While Sample 2 rated UL-94 V2, it was not a useful ABS composition because of its very low heat distortion temperature. (Normally, HDT value should be in the 145°–180° F range for comventional flame retardant systems).

Sample 6, although rated VO, was not a useful PET composition, since severe delamination and, hence, incompatibility and extreme brittleness were noted.

Likewise, Samples 3 and 4 in Table VIII show that, when pentabromotoluene is used in ABS utilizing the Underwood flame retardant additive mixture at Underwood's loadings levels, or when the same additive mixture is used in ABS at the preferred loading levels of the present invention, useful formulations did not result. Moreover, incorporation of polybrominated alkylbenzenes in accordance with the teachings of the present invention in polypropylene (Sample 5) likewise produced no useful result. Neither Samples 3 nor 4 were flame retardant as measured by the UL-94 test, and Sample 5, although rated V2, was not a useful polypropylene composition because of excessive juicing and bloom.

The data of Table VIII, therefore, demonstrate that the teachings of Rueter and Underwood would not lead one skilled in the art to expect that polybrominated alkylbenzenes, when used in ABS compositions in accordance with the teachings of this invention, would be either effective as flame retardants or yield a composition having acceptable physical properties.

We claim:

1. A flame retardant ABS resin composition comprising:
    a normally flammable acrylonitrile-butadiene-styrene resin;
    as a flame retardant agent, an effective amount of a polybrominated higher alkylbenzene containing about 30–70 percent bromine by weight of the agent; and
    an enhancing agent.

2. A composition, as claimed in claim 1, where in the polybrominated higher alkylbenzene is a compound of the structure:

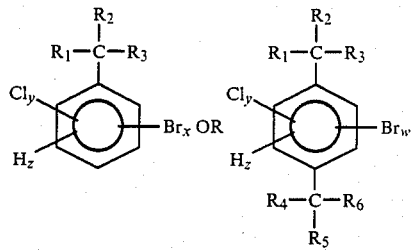

where x is 3 to 5, y is zero or 1, z is zero or 1, w is 2 to 4, and where $R_1$ and $R_4$ are hydrogen or methyl, and $R_2$, $R_3$, $R_5$, $R_6$ are alkyl groups ranging independently from 1 to 16 carbon atoms and where the total number of carbon atoms in $R_1$, $R_2$ and $R_3$ and in $R_4$, $R_5$ and $R_6$ from 5 to 17.

3. A composition, as claimed in claim 2, where the polybrominated higher alkylbenzene is a compound of structure (I) or structure (II), where x is 4 or 5 and w=3 or 4.

4. A composition, as claimed in claim 2, wherein the polybrominated predominantly secondary alkylbenzene is a tetra-or penta-bromo secondary $C_{6-18}$ alkylbenzene.

5. A composition, as claimed in claim 2, wherein the polybrominated higher alkylbenzene is a tri- or tetra-bromo secondary or tertiary di-$C_{6-18}$-alkylbenzene.

6. A composition, as claimed in claim 4 or 5, wherein the alkyl groups are a mixture of $C_{10-12}$ alkyl groups.

7. A composition, as claimed in claim 4 or 5, wherein the the polybrominated alkylbenzene is a liquid mixture of $C_{10-12}$ tetra- and penta-bromoalkylbenzenes.

8. A composition, as claimed in claim 1, wherein the composition comprises about 50 to 90 percent acrylonitrile-butadiene styrene resin, about 5 to 25 percent polybrominated higher alkylbenzene, and about 0.1 to 15 percent enhancing agent, all by weight of the flame retardant acrylonitrile-butadiene-styrene resin composition.

9. A composition, as claimed in claim 1, wherein the enhancing agent is antimony trioxide.

* * * * *

UNITED STATES PATENT AND TRADEMARK OFFICE
CERTIFICATE OF CORRECTION

PATENT NO.   :   4,829,118

DATED        :   May 9, 1989

INVENTOR(S)  :   Nicolai A. Favstrisky, Enrico J. Termine, and
                 Dennis M. Borden It is certified that error appears in the above-identified patent and that said Letters Patent is hereby corrected as shown below:

Column 1, line 9 "rsin" should be --resin--

Column 3, line 64 "y is zero or 1, w is" should be --y is zero or 1, z is zero or 1, w is--

Column 5, line 10 "R$_8$" should be --R$_9$--

Column 13, line 37 "ABS" should be --acrylonitrile-butadiene-styrene--

Signed and Sealed this

Twelfth Day of June, 1990

Attest:

HARRY F. MANBECK, JR.

Attesting Officer    Commissioner of Patents and Trademarks